United States Patent
Smith et al.

(10) Patent No.: US 8,980,203 B1
(45) Date of Patent: *Mar. 17, 2015

(54) PROCESS FOR OBTAINING HIGHLY PURE LITHARGE FROM LEAD ACID BATTERY PASTE

(71) Applicant: Retriev Technologies Incorporated, Anaheim, CA (US)

(72) Inventors: W. Novis Smith, Philadelphia, PA (US); Steven Kinsbursky, Long Beach, CA (US)

(73) Assignee: Retriev Technologies Incorporated, Anaheim, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/902,187

(22) Filed: May 24, 2013

Related U.S. Application Data

(63) Continuation of application No. 13/660,548, filed on Oct. 25, 2012, now Pat. No. 8,562,923.

(51) Int. Cl.
C22B 13/00 (2006.01)
C22B 3/00 (2006.01)

(52) U.S. Cl.
CPC .................................... C22B 13/045 (2013.01)
USPC .................. 423/92; 423/93; 423/619; 429/49

(58) Field of Classification Search
None
See application file for complete search history.

(56) References Cited

U.S. PATENT DOCUMENTS

| | | | |
|---|---|---|---|
| 2,152,242 A | 3/1939 | Curtin | |
| 4,107,007 A | 8/1978 | Gaeumann et al. | |
| 4,222,769 A | 9/1980 | Okuda et al. | |
| 4,269,810 A | 5/1981 | Kolakowski | |
| 4,769,116 A | 9/1988 | Olper et al. | |
| 5,211,818 A | 5/1993 | Moure et al. | |
| 7,507,496 B1 | 3/2009 | Kinsbursky et al. | |
| 7,785,561 B1 | 8/2010 | Smith et al. | |
| 8,323,595 B1 | 12/2012 | Smith et al. | |
| 8,562,923 B1 * | 10/2013 | Smith et al. ..................... | 423/92 |
| 2006/0239903 A1 | 10/2006 | Guerriero et al. | |
| 2010/0043600 A1 | 2/2010 | Martini | |

FOREIGN PATENT DOCUMENTS

WO   WO 99/44942   9/1999

OTHER PUBLICATIONS

Notification of Transmittal of the International Search Report and Written Opinion of the International Searching Authority, or the Declaration Issued for International Application No. PCT/US/2013/042612 Dated Aug. 23, 2013.

* cited by examiner

Primary Examiner — Steven Bos
(74) Attorney, Agent, or Firm — RatnerPrestia

(57) ABSTRACT

The present invention relates to the recovery of high purity litharge from spent lead acid battery paste at a low temperature which does not produce sulfur dioxide. In the process lead acetate or other lead salt is produced which is converted to high purity litharge by precipitation with a base.

18 Claims, No Drawings

PROCESS FOR OBTAINING HIGHLY PURE LITHARGE FROM LEAD ACID BATTERY PASTE

CROSS REFERENCE TO RELATED APPLICATIONS

This application is a continuation-in-part of U.S. application Ser. No. 13/660,548, filed Oct. 25, 2012, the contents of which are hereby incorporated by reference in its entirety.

FIELD OF THE INVENTION

The present invention relates to the recovery of highly pure litharge (PbO) from spent battery lead acid battery paste. More particularly, there is provided a low temperature process which does not generate sulfur dioxide and a novel process step of converting lead acetate to PbO is used.

BACKGROUND OF THE INVENTION

The conversion of the dominant recycle stream (about 60% of the weight) from crushing lead acid batteries to a useful product has been costly, highly energy intensive and generates considerable hazardous dust, sulfur dioxide, carbon dioxide and carbon monoxide pollution when performed in smelters. The recovered lead metal from the grids is simply smelted while the lead sulfate/red lead/lead metal powder paste containing antimony and barium sulfate waste must be mixed with carbon and smelted in the furnaces along with the lead metal grid to achieve a practical and low cost route for handling the paste material. Barium sulfate is usually added at 0.5 to 2% levels in lead acid batteries to control lead sulfate crystal size during electrode charging/discharging. The smelting with carbon converts the lead sulfate to sulfur dioxide which must be scrubbed along with the extra lead dust and carbon powder which is generated. This is also a very energy intensive and polluting process. The lead metal from the smelters is purified by sparging and forming a flux, which may lead to further contamination resulting in further losses and costs. For the electrodes used in lead acid batteries, a form of litharge is produced by the slow oxidation of molten lead metal (99.999% purity) at 380-500° C. to form an impure form of a mix of litharge and fine lead metal particles at 15-30% by weight. It is too expensive and time consuming to try to oxidize this remaining lead to litharge. This process also forms massicot, which is not desired because of its slower reaction during electrode formation.

In U.S. Pat. No. 4,222,769 spent battery paste is desulfurized and then transformed into metallic lead by roasting in the presence of a carbon reducing agent.

U.S. Pat. No. 4,769,116 discloses treating exhausted lead acid battery paste with sodium hydroxide to produce a solution of sodium sulfate and a desulfurized paste which is subjected to electrowinning to produce metallic lead.

U.S. Patent Publication No. 2006/0239903 to Guerriero discloses high purity lead hydroxide and lead oxide from spent acid battery paste that has been desulfurized and converted into a carbonate or hydroxide and then calcinated at 500° C. to obtain pure PbO. The multi-step process includes subsequent treating with acetic acid. The lead acetate solution was treated with an alkali or alkaline earth hydroxide to produce lead hydroxide.

U.S. Patent Publication No. 2010/043600 to Martini discloses a process for recovery of high purity lead compounds from electrode paste slime. The process includes dissolving lead oxide in the paste in suitable acid, reducing any insoluble lead dioxide with hydrogen peroxide, a sulfite or sulfurous anhydride, converting the lead oxide to lead sulfate and then treating the lead sulfate in a solution containing an acetate, calcinating the desulfurized material to get impure lead monoxide followed by leaching of the lead monoxide with acetate acid followed by filtering and then treating further with an alkali hydroxide or alkaline earth hydroxide to obtain soluble acetates to get a precipitate of lead hydrate or lead monoxide.

U.S. Pat. No. 7,507,496 to Smith et al relates to the selective removal of sulfate from battery paste and recovering $Pb_3O_4$ which has small amounts of impurities and can be separated from the impurities by dissolution.

U.S. Pat. No. 5,211,818 discloses a process wherein the paste sludge resulting from the exhausted batteries is treated with a solution of ammonium sulfate and the metallic lead constituent is recovered by electrowinning.

International Publication No. WO99/44942 discloses a process of producing lead monoxide from spent lead batteries using fluxing agents and an organic reducer in the calcinations step at a temperature of 400° C.-450° C.

Typically litharge is made in the Barton process by heating lead metal to 380-500° C. to keep it molten and passing controlled amounts of air or oxygen through it to partially oxidize it to litharge containing up to 25% lead with strong agitation. The product lead oxide (litharge) that forms initially contains very fine lead metal (up to 25%) which is intimately mixed into the litharge lead oxide mix for the electrodes, which more slowly reacts during electrode plate formation. The litharge (leady oxide) contains up to 5% massicot (another allotrope of lead oxide).

Currently, litharge is purchased commercially by the lead acid battery industry as leady oxide (PbO plus about 15-75% lead metal powder) because the oxidative conversion of molten lead metal at about 380-500° C. in a Barton reactor or rotary reactor slows down as the lead metal level is reduced. Therefore, for economic reasons, 15-25% lead metal powder is left in the PbO to be reacted (oxidized) later during the electrode plate electrochemical formation. The plate electrochemical formation step requires up to two days with the positive electrode requiring the most lengthy times for formation. Presently, the leady oxide is used for both the positive and negative plates and is also highly reactive when mixed with sulfuric acid prior to actual plate formation. A desirable material for the positive plate electrode is $Pb_3O_4$ (e.g., red lead). However, $Pb_3O_4$ is too expensive for commercial use in making batteries, and the $Pb_3O_4$ material available commercially is only about 25% $Pb_3O_4$ with the balance being PbO present as both white massicot (beta form) and orange litharge (alpha form).

Massicot does not convert readily, if at all, to red lead when heated in the 450-500° C. range and may inhibit the conversion of litharge to red lead. This accounts for the lower purity of the commercial $Pb_3O_4$ since the reaction is primarily on the surface which gives good color (orange-red), but the further oxidation of the particle interior of the PbO is slowed or stopped by the presence of massicot. The presence of massicot in the litharge also slows down the electrochemical formation production step for the lead paste electrodes during formation whether for the positive or negative electrodes along with the extent of total formation capacity being reduced initially in the battery electrodes.

Thus, there is a need for a process which produces high purity litharge (preferably >95% purity) more economically and quickly with no massicot present. Such high purity litharge offers substantial savings in electrode formation production time, better quality and also allows for further oxidation to higher purity red lead. Such ease of oxidation of litharge to red lead significantly reduces the formation time of the electrodes of a lead acid battery by 50% or more.

SUMMARY OF THE INVENTION

According to the invention, conditions are provided for converting concentrated aqueous lead acetate solutions (or the use of any other concentrated solutions of a highly soluble lead salt such as the nitrate, formate, lactate, citrate, perchlorate, glycolate, etc.) to high purity litharge quantitatively and rapidly using a strong base. In one aspect of the invention, high purity litharge (PbO) is obtained from spent lead acid battery paste. In another aspect of the invention, red lead ($Pb_3O_4$) is prepared using the litharge of the invention.

According to one embodiment of the invention, a process for obtaining high purity litharge (PbO) is provided comprising the steps of: treating lead acid battery paste with a reducing agent in an acid medium to form an aqueous slurry; adding a first base to the aqueous slurry to remove the sulfate; filtering the slurry to form a cake and washing the cake; combining the cake with an aqueous organic acid to form a concentrated solution of a lead salt; filtering the solution to remove any insoluble; and then combining a second base with the solution at an elevated temperature to form litharge.

According to various aspects of the invention, the lead salt may be at least one of an acetate, a nitrate, a formate, a lactate, a citrate, a perchlorate, a glycolate and combinations thereof, the first base may be selected from sodium carbonate or an alkali hydroxide, the acid may be an aqueous inorganic acid or aqueous organic acid such as acetic acid, nitric acid, perchloric acid, glycolic acid, formic acid, citric acid, lactic acid and combinations thereof, the reducing agent may be $SO_2$ or sodium meta bisulfite, the alkali hydroxide and the second base may be selected from sodium hydroxide and potassium hydroxide and the acid medium may be selected from acetic acid and sulfuric acid.

According to other aspects of the invention, at least part of the process may be carried out in a stainless steel container or an acid-resistant metal alloy container and the lead acid battery paste may be first screened to remove plastic and metal from the paste and treated with a reducing agent at a pH of <5, preferably <4. According to a further aspect of the invention, sulfuric acid may be used to maintain the pH at <5, preferably <4.

Further, according to other aspects of the invention, combining the second base with the solution may be performed at a temperature of about 50° C. to 100° C., preferably about 70° C. to about 90° C. (e.g., about 80° C.), with an amount of the base used which is effective to result in the solution having a pH of at least about 10, preferably at least about 11.

Further according to still other aspects of the invention, the litharge may be dried in an oven at a temperature of between about 120° C. and 180° C., milled to form a mesh powder and heated in air at about 450° C. to about 500° C. (e.g., about 495° C.) to form red lead. In yet another aspect of the invention, a battery comprising the litharge formed by the process described herein is provided.

These and other objects and advantages of the invention will be better understood by reading of the Detailed Description of the Invention and the Examples.

DETAILED DESCRIPTION OF THE INVENTION

According to one embodiment of the present invention, there is provided a process for obtaining high purity litharge (PbO) from spent lead acid battery paste which comprises the steps of: 1) treating lead acid battery with a reducing agent selected from the group consisting of sodium meta-bisulfite and $SO_2$, in an acid medium to produce a pH of <5, preferably <4; 2) combining (e.g., by adding) a base selected from the group consisting of an alkali hydroxide and/or sodium carbonate with the slurry of step 1); 3) filtering the aqueous slurry from step 2) to form a filter cake; 4) combining the filter cake of step 3) with a quantitative amount of an aqueous acid to form a concentrated solution of a lead salt (>10% by weight); 5) filtering the solution of step 4) to remove any unreacted products; and then combining a base selected from the group consisting of sodium hydroxide and potassium hydroxide with the filtrate of step 5) at a temperature of about 50 to 100° C., preferably about 80° C. to form high purity litharge which is recovered; and 7) heating the recovered litharge at about 450° C.-500° C., preferably about 495° C., in air for about three hours to form red lead $Pb_3O_4$.

Example 1

The process is composed of three steps which may be performed in sequence in order to obtaining litharge in high yields and high purity at low costs.

In the first step, the screened lead acid paste (preferably <–140 mesh) free of the plastic and metal grids and collectors from the crushed lead acid batteries was slurried in aqueous sodium meta-bisulfite in an acid medium (pH of <4, preferably <2). This reaction is exothermic at a pH of <2 and rapidly reduced most of the red lead and higher valence lead compounds to the plus two lead. A base such as sodium hydroxide (or sodium carbonate) was added to convert the insoluble lead sulfate (containing some lead metal powder) to the insoluble impure lead hydroxide or lead carbonate/metal powder (5-15%), with the sulfate forming a sodium sulfate solution which is then removed by filtration. This slurry was filtered and the cake washed free of sodium sulfate and introduced into a stainless steel reactor containing water and acetic acid. Most of the lead metal powder remained insoluble in the cake. The lead content of the sodium sulfate solution filtrate was less than 0.1% by weight.

In the second step, the impure cake was added to water containing a quantitative amount of acetic acid to quantitatively dissolve all the lead hydroxide (or lead carbonate, when soda ash is used in the first step instead or sodium hydroxide) as lead acetate. The solution now consisted of a concentrated lead acetate solution with the insoluble phase in the slurry now consisted of the insoluble fine lead metal powder from the crushing action of the battery breaker, unreacted red lead, and a small amount of impurities. This slurry was adjusted to a pH of 4-5 to ensure total reaction and stirred at 50° C. for complete solution of the lead acetate. The pH of the slurry was adjusted to about 7 and the slurry was then filtered to produce a clear solution of concentrated lead acetate (15-30% weight concentration) and then the pH was adjusted to about 7-8 with sodium hydroxide.

In the third step, the clear lead acetate (pH of 7-8) was added to a stainless steel reactor and heated to about 50-90° C. (preferably >82° C.), and 50% sodium hydroxide solution was added rapidly with very good agitation to achieve a pH of >10 (preferably >11) with an exothermic reaction occurring. A pale yellow to red-orange precipitate was formed and becomes more intense in color with continued heating and stirring over the next 10-30 minutes. The temperature was maintained at >90° C. The pale orange slurry was filtered hot after 30 minutes. The yield of high purity (tetragonal-yellow/orange) litharge was quantitative based on the lead in solution. The filter cake was washed until the pH was 9-10. The lead content of the filtrate was 0.07% lead, indicating essentially total recovery. The product litharge was treated in an oven to >120 to 180° C. to ensure it was dry and free of volatile impurities. The dried cake was milled to produce a −100 mesh powder which was used directly to make a paste for forming lead acid battery electrodes.

The litharge can be readily converted directly into red lead ($Pb_3O_4$) at 495° C. for over three hours in the presence of air. The high purity material is also useful for making high performance lead acid battery electrodes.

Example 2

To 5 kg of dry lead acid battery paste (−140 mesh) was added 3.5 liters of water with stirring (e.g., using a Teflon® coated stirrer) and then 500 g of sulfuric acid was added to obtain a pH of <1. The mixture was cooled to 18° C.

Thereafter, 650 g of sodium meta bisulfite in 2 L of water (25% solution) was gradually added with cooling to maintain a temperature of 18° C.-20° C. After 2 hours, the slurry was heated to 50° C. Then solid sodium carbonate (soda ash) was added until a pH of 4 was achieved and then until a pH of 10 was achieved, then heated at 60° C. for two hours while maintaining the pH at 10-11 with additional sodium carbonate. The mixture was filtered and the filter cake was washed four times until a pH of 9 was achieved.

8 liters of DI water was added to a stainless steel container. The filter cake from Step 1 was carefully added to the stirred solution of 8 liters water and 1700 g acetic acid with the pH maintained at about 4.5 for over 1 hour to avoid excessive foaming. The slurry was heated to 50° C.-60° C. and stirred one hour and the pH was maintained at 4.5-5. This slurry was filtered to obtain a clear solution. The filter cake was washed once with a minimum amount of water. This was combined with the main filtrate and the pH of this filtrate was adjusted to 7 with 50% sodium hydroxide; the filtrate was permitted to settle for about 30-60 minutes and then polished filtered. The pH was again adjusted to 8.

The filtrate was heated to 80° C. and then 2000 g of 50% sodium hydroxide was added to the solution to precipitate the litharge (yellow to pale orange). The pH was about 10.5 to 11. The reactor was heated to maintain the heat at 90° C. and stirred while protecting from air ($CO_2$) for 30 minutes and then filtered hot.

The filter cake was washed four times to obtain a pH of <9.5 in the filtrate.

The filter cake was weighed and then placed into a drying tray and dried at 180° C. for at least 6 hours. Reweighed on drying, the yield of litharge was about 2.2 kg. X-ray diffraction (XRD) showed 100% litharge and no massicot.

Example 3

Step 1: 5.0 kg of dry lead acid battery paste (−140 mesh) containing about 10-15% lead alloy powder was added to a polypropylene 5 gallon container with lid, Teflon® coated stirrer, thermocouple, and heating time. 3.5 liters of water was added to stirring. 500 g sulfuric acid was slowly added and the pH was kept at <1. The mixture was stirred and cooled to 18° C. with the addition of ice to the container. 650 g of sodium meta bisulfite in 2 L of water (25% solution) was gradually added over 1 hour while adding ice as necessary to maintain the temperature at 18° C.-20° C. After the addition was complete, the pH was adjusted to a pH of 1-2. Volume at this point was about 6.5 liters. Stirring was continued for an additional hour then checked if there was a slight odor of $SO_2$ in the reactor to indicate that it was still in excess. Then the mixture was heated up to 50° C. for 30 minutes to drive off excess sulfur dioxide which is scrubbed. 300 g of sodium carbonate was added until a pH of 4 and then continued on with about 1500 g of 50% sodium hydroxide added until a pH of 11 and then heated at 60° C. for two hours while maintaining the pH at 11 with additional sodium hydroxide. The mixture was filtered and the cake washed three times until a pH of less than 9 was achieved.

Step 2: The filter cake from Step 1 was added to a stainless steel container equipped with a heating tape and stirrer together with 8 liters of water. To the stirred solution was added 1700 g of acetic acid until the pH remained at 4.5. The slurry was heated to 60° C. for one hour. The pH mixture was adjusted to about 7 with 50% sodium hydroxide (about 400 g) and allowed to settle for about 30-60 minutes and then filtered through P2 filter paper into a polyethylene vacuum filter flask, changing filter papers when necessary. The filter cake was washed once with a minimum amount of water and this filtrate was combined with the main filtrate. The pH of the filtrate was again adjusted to about 7. The filtrate was polish pressure filtered (10 psi) through a 0.2 micron filter cartridge to obtain a sparkling solution and then added into a large stainless steel container equipped with insulated heating tape and stirrer.

Step 3: The solution was then stirred and heated to 82° C. and 2000 g 50% sodium hydroxide was added to the solution to precipitate the litharge (yellow to orange). The pH was about 10.5 to 11. The reactor was covered and the heat was maintained to keep the slurry at 90° C. and stirred while protecting from air ($CO_2$) for 30 minutes.

The filter cake was washed four times until a pH of <9.5 in the filtrate was obtained. The damp cake was weighed and then placed into a drying tray and dried at 180° C. for at least 6 hours. The yield of litharge was 2.2 kg. XRD showed 100% litharge and no massicot.

Example 4

Step 1: 5.0 kg dry paste (−140 mesh) was added to a 5-gallon stainless steel container with a lid, a Teflon® coated stirrer, a thermocouple, and heating tape. A portable exhaust unit was used over the top of the reactor. 4 liters of water was then added and stirred. 900 g of sulfuric acid was slowly added and the pH was measured to be about 0-1. This mixture was stirred and cooled to 18° C. in an ice bath. 1200 g of sodium-metabisulfite in 3.5 L of water (25% solution) was gradually added over 2 hours while the temperature was maintained at 18-20° C. The pH was 1 after this addition was complete. The mixture was stirred for two more hours and the resulting slurry was heated to 70° C. for over one hour and then the heating was stopped. Solid sodium carbonate (soda ash, 520 g) was added to the mixture until a pH of 4 was realized. More soda ash was added to achieve a pH of 10.5. The mixture was maintained at a temperature of 65° C. and stirred an additional 1.5 hours. The resulting slurry was filtered and the filter cake was washed five times until the pH of the wash was 9. The cake was a light brown gray in color.

Step 2: 10 liters of DI water and 2700 g acetic acid were added to a stainless steel container (20-liter size) equipped with a heating tape and stirrer. The solution was heated to 70° C. and the filter cake from Step 1 was slowly added to this solution in order to prevent excessive foaming and controlling the reaction (about 60 minutes). The pH was monitored near the end of the addition and was 4.5. The slurry was maintained at about 70° C. and stirred 45 minutes. The color of the slurry at this point was dark black red and very thin. The pH of the reaction was adjusted up to 6.5-7.0 with 400 g of 50% sodium hydroxide and the stirring and heating were cut off. The slurry was allowed to settle for 30 minutes and the small amount of stable foam was skimmed off. The clearer top liquid layer was decanted into a Buchner filter and filtered through P2 filter paper into a polyethylene vacuum filter flask. The rest of the settled slurry was then filtered and the filter cake was washed twice with a minimum amount of water. The pH of the filtrate was adjusted to 6.5-7.0 with 50% sodium hydroxide (about 50 g) and the filtrate was allowed to settle for about 30 minutes (temperature of solution was 33° C.). The solution was run through a pressure 0.2 micron filter cartridge (10 psi) into a large stainless steel container (20 liter) equipped with an insulated heating tape and stirrer to obtain a sparkling solution. The pH of the filtrate was adjusted to 8.5 with 50% NaOH (about 290 g).

Step 3: The filtrate solution from Step 2 was stirred and heated to 87° C. and 2700 g 50% sodium hydroxide was rapidly added to the solution to precipitate litharge (light tomato red/orange). The pH of this solution after addition of sodium hydroxide was 11-12. The reaction was covered and the heat maintained at 90-98° C. and stirred while protecting from air ($CO_2$) for 20 minutes and then the heat was cut off and the solution was filtered hot. The filter cake was washed four times until a pH of 9 in the filtrate was obtained. The damp filter cake weighed 3700 g and was then placed into drying tray (high alloy type) and dried at 180° C. overnight. The dried litharge weighed 3200 g with handling losses accounting to about 200 g. A blender was used to mill the litharge to a −200 mesh powder.

Step 4: The red orange litharge was heated in a high alloy metal tray at 495° C. for twelve hours to form red lead.

Example 5

Step 1: To 5 kg of dry lead acid battery paste (−140 mesh) was added 3.5 liters of water with stirring and then 500 g of sulfuric acid was added to obtain a pH of <1. The mixture was cooled to 18° C. with ice addition. 650 g of sodium meta bisulfite in 2 liters of water (25% solution) was gradually added over two hours. After two hours, the slurry was heated to 50° C. Then, solid sodium carbonate (soda ash) was added until a pH of 4, and then until a pH of 10, and then heated at 60° C. for two hours while maintaining the pH at 10-11 with additional sodium carbonate. The mixture was filtered and the filter cake was washed three times until a pH of less than 9 was realized.

Step 2: 8 liters of deionized water containing 1700 g acetic acid was added to a stainless steel container. The filter cake from Step 1 was carefully added with the pH maintained at about 4.5. The resulting slurry was heated to about 60° C. and stirred one hour and the pH was maintained at about 4.5. The resulting slurry was filtered to obtain a clear solution. The filter cake was washed once with a minimum amount of water and the wash was combined with the main filtrate. The pH of this filtrate was adjusted to 8 with 50% sodium hydroxide, settled for about 30-60 minutes and then polish filtered.

Step 3: After polish filtering, the filtrate was heated to over 60° C. and 50% NaOH was rapidly added to the filtrate to a pH of 11-12. The filtrate was kept free of contact with glass surfaces and kept covered to prevent contamination by outside impurities including silica and other interfering ions (e.g., ammonia and/or chelating agents). Almost immediately on rapid addition of the 50% NaOH to a pH of 11, a tomato red precipitate formed. After stirring 20 minutes and maintaining the temperature at >80° C. and the pH at 11-12, the slurry was filtered and washed to a pH of 9, and dried at 180° C. for 12 hours. The orange solid was shown to be 100% litharge with no detectable massicot (from XRD analysis). The yield was quantitative based on soluble lead acetate in solution.

Step 4: The litharge was heated in air in a thin layer at 495° C. for 12 hours to produce red lead which was >90% pure by XRD.

What is claimed is:

1. A process for obtaining high purity litharge (PbO) from spent lead acid battery paste which comprises the steps of:
   treating lead acid battery paste with a reducing agent in an acid medium to form an aqueous slurry;
   combining a first base with the aqueous slurry;
   filtering the aqueous slurry to form a cake and washing the cake to form a washed cake;
   combining the washed cake with an acid to form a concentrated solution of a lead salt;
   filtering the solution to remove any insoluble material and to form a filtered solution; and
   combining a second base with the filtered solution at an elevated temperature to form litharge.

2. The process of claim 1 wherein adding the second base to the solution is performed at a temperature of about 50° C. to 100° C.

3. The process of claim 1 which comprises treating the lead acid battery paste at a pH of <5 with said reducing agent.

4. The process of claim 3 wherein sulfuric acid is used to maintain the pH at <5.

5. The process of claim 1 wherein the reducing agent is selected from the group consisting of sodium meta bisulfite and $SO_2$.

6. The process of claim 1 wherein the lead salt comprises at least one of an acetate, a nitrate, a formate, a lactate, a citrate, a perchlorate, or a glycolate.

7. The process of claim 1 wherein the first base is selected from the group consisting of sodium carbonate and an alkali hydroxide.

8. The process of claim 1 wherein the second base is selected from the group consisting of sodium hydroxide and potassium hydroxide.

9. The process of claim 1 wherein the acid medium is formed with an acid selected from the group consisting of acetic acid and sulfuric acid.

10. The process of claim 1 wherein the litharge is further heated in air at about 450° C. to about 500° C. to form red lead.

11. The process of claim 1 further comprising at least one of drying the litharge in an oven at a temperature of between about 120° C. and 180° C. or milling the litharge to form a mesh powder.

12. The process of claim 1 wherein combining the second base with the solution results in the solution having a pH of at least about 10.

13. The process of claim 1 wherein combining the second base with the solution results in the solution having a pH of at least about 11.

14. The process of claim 1 wherein the lead acid battery paste is screened to remove plastic and metal from the paste.

15. The process of claim 7 wherein the alkali hydroxide is selected from the group consisting of sodium hydroxide and potassium hydroxide.

16. The process of claim 1 wherein at least part of the process is carried out in a stainless steel container or an acid-resistant metal alloy container.

17. The process of claim 1 wherein combining the second base with the solution is performed at a temperature of about 70° C. about 90° C.

18. The process of claim 1 wherein the acid comprises at least one of acetic acid, nitric acid, perchloric acid, glycolic acid, formic acid, citric acid, or lactic acid.

\* \* \* \* \*